(12) United States Patent
Wada et al.

(10) Patent No.: US 7,400,660 B2
(45) Date of Patent: Jul. 15, 2008

(54) TERAHERTZ WAVE GENERATION SYSTEM

(75) Inventors: Satoshi Wada, Wako (JP); Norihito Saito, Wako (JP); Mayumi Kato, Wako (JP)

(73) Assignee: Riken, Wako-Shi (JP)

( * ) Notice: Subject to any disclaimer, the term of this patent is extended or adjusted under 35 U.S.C. 154(b) by 53 days.

(21) Appl. No.: 11/303,913

(22) Filed: Dec. 19, 2005

(65) Prior Publication Data

US 2006/0153255 A1 Jul. 13, 2006

(30) Foreign Application Priority Data

Dec. 20, 2004 (JP) ............................. 2004-367530

(51) Int. Cl.
*H01S 3/13* (2006.01)
(52) U.S. Cl. .............................. 372/32; 372/21; 372/23
(58) Field of Classification Search .................. 372/32, 372/21, 23
See application file for complete search history.

(56) References Cited

U.S. PATENT DOCUMENTS 6,563,622 B2 * 5/2003 Mueller et al. .............. 398/182

2001/0038652 A1 * 11/2001 Geng et al. .................. 372/25

OTHER PUBLICATIONS

Goto et al., "Photonic crystal fiber in terahertz region," 29p-N-7, Lecture Pre-Prints from the 51st Applied Physics Joint Lecture Meeting, Tokyo Engineering University, Mar. 2004, with English language translation.

* cited by examiner

*Primary Examiner*—Dung T Nguyen
(74) *Attorney, Agent, or Firm*—Birch, Stewart, Kolasch & Birch, LLP

(57) ABSTRACT

To make a terahertz wave generation system capable of easily illuminating terahertz wave on an arbitrary position and to easily realize the system for practical use by effectively using existing systems and devices, the terahertz wave generation system has: a two-wavelength oscillation laser device capable of simultaneously oscillating laser light having two wavelengths and varying the wavelengths; an optical fiber that transmits laser light having two wavelengths, which has been output from the two-wavelength oscillation laser device; and wavelength conversion means for generating terahertz wave by difference frequency generation using the laser light having two wavelengths, which has been transmitted by the above-described optical fiber.

12 Claims, 2 Drawing Sheets

TERAHERTZ WAVE GENERATION SYSTEM

BACKGROUND OF THE INVENTION

1. Field of the Invention

The present invention relates to a terahertz wave generation system, particularly to a terahertz wave generation system that generates terahertz wave by difference frequency generation being nonlinear optical effect.

2. Description of the Related Art

Conventionally, various kinds of research have been conducted regarding a method of performing spectroscopic analysis, imaging measurement or the like by using terahertz wave that is generated by difference frequency generation being nonlinear optical effect.

Meanwhile, it is necessary to illuminate terahertz wave on a subject of spectroscopic analysis or a subject of imaging measurement in order to use terahertz wave in spectroscopic analysis or imaging measurement. Generally, terahertz wave are transmitted to the above-described subjects by special propagation.

However, since such special propagation is poor in operability and transmission efficiency, the use of optical fibers having excellent operability and transmission efficiency is expected as means for transmitting terahertz wave to a subject to be illuminated, but existing optical fibers are made of a material having high absorption rate of terahertz frequency region, so that they cannot be used in transmitting terahertz wave.

With such a background, although the use of new photonic crystal fibers were attempted in recent years, they are still on a development stage and have not been practically used yet.

OBJECTS AND SUMMARY OF THE INVENTION

The present invention has been created in view of the above-described various problems and backgrounds that prior art has, and it is an object of the invention to provide a terahertz wave generation system that can easily illuminate terahertz wave on an arbitrary position and can be easily realized for practical use by effectively using existing concept of optical generation, optical elements, systems and devices.

To achieve the above-described object, the terahertz wave generation system according to the present invention is a system that transmits laser light having two wavelengths via optical fiber to an arbitrary position where a subject of spectroscopic analysis or a subject of imaging measurement is located, generates terahertz wave by difference frequency generation using the laser light having two wavelengths, which has been transmitted to the arbitrary position, and illuminates the generated terahertz wave on the above-described subject.

Therefore, according to terahertz wave generation system of the present invention, terahertz wave can be easily illuminated on an arbitrary position, and simultaneous generation of laser light having two wavelengths, transmission of laser light having two wavelengths or difference frequency generation by using laser light having two wavelengths can be realized by effectively using existing systems and devices, so that the system can be easily realized for practical use.

Specifically, in the present invention, the terahertz wave generation system has: a two-wavelength oscillation laser device capable of simultaneously oscillating laser light having two wavelengths and varying the wavelengths; an optical fiber that transmits laser light having two wavelengths, which has been output from the above-described two-wavelength oscillation laser device; and wavelength conversion means for generating terahertz wave by difference frequency generation using the laser light having two wavelengths, which has been transmitted by the above-described optical fiber.

Further, in the present invention, the above-described two-wavelength oscillation laser device has: a wavelength variable laser medium capable of oscillating laser in a predetermined range of wavelength area; a birefringent acoustooptical element into which output light from the above-described wavelength variable laser medium is made incident; a single laser resonator, which is a single laser resonator in which the above-described wavelength variable laser medium and the above-described acoustooptical element are sequentially disposed, and consists of mirrors having a predetermined reflectance that are arranged in a facing manner so as to reflect and reciprocate only diffracted light, which has been diffracted in a predetermined direction by the above-described acoustooptical element; acoustic wave input means that is installed to the above-described acoustooptical element and inputs acoustic wave into the above-described acoustooptical element; and a pumped laser that makes pumped laser light be incident into the above-described laser resonator.

Further, in the present invention, the above-described two-wavelength oscillation laser device has: a wavelength variable laser medium capable of oscillating laser in a predetermined range of wavelength area; a birefringent acoustooptical element into which output light from the above-described wavelength variable laser medium is made incident; an optical element that corrects dispersion of diffracted light, which is output from the above-described wavelength optical element, and outputs the light always in a fixed direction regardless of wavelength; a single laser resonator, which is a single laser resonator in which the above-described wavelength variable laser medium and the above-described acoustooptical element are sequentially disposed, and consists of mirrors having a predetermined reflectance that are arranged in a facing manner so as to reflect and reciprocate only diffracted light, which has been diffracted in a predetermined direction by the above-described acoustooptical element; acoustic wave input means that is installed to the above-described acoustooptical element and inputs acoustic wave into the above-described acoustooptical element; and a pumped laser that makes pumped laser light be incident into the above-described laser resonator.

Further, in the present invention, the above-described optical fiber is a polarization-preserving fiber capable of transmitting the above-described light while the plane of polarization of transmitting light is preserved.

Furthermore, in the present invention, above-described wavelength conversion means has a DAST crystal.

Consequently, according to the present invention, it is possible to easily illuminate terahertz wave on an arbitrary position, and an excellent effect is exerted that the present invention can be easily realized for practical use since the invention can be created by effectively using the existing systems and devices.

Then, the present invention can be used when performing spectroscopic analysis or imaging measurement using terahertz wave.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment example of the terahertz wave generation system according to the present invention will be described in details.

Figure 1:
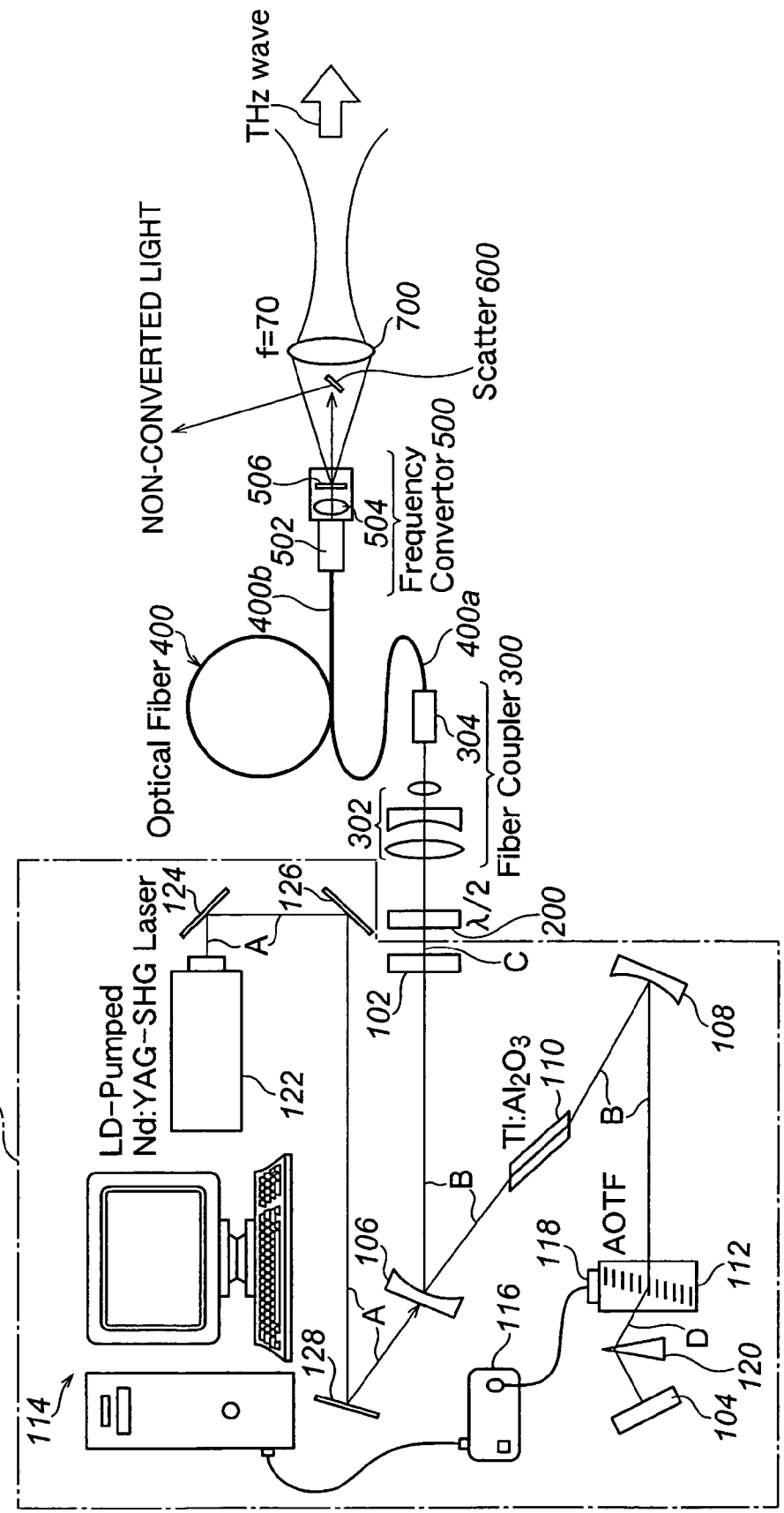
FIG. 1 is a conceptual constitution exemplary view of a terahertz wave generation system according to an example of the embodiment of the present invention.

FIG. 1 shows the conceptual constitution exemplary view of a terahertz wave generation system according to an embodiment example of the present invention.

The terahertz wave generation system 10 has: a two-wavelength oscillation laser device 100 capable of oscillating laser light having two wavelengths and capable of varying the wavelengths; a λ/2 plate 200 that adjusts polarization of laser light having two wavelengths, which has been output from the two-wavelength oscillation laser device 100; a fiber coupler 300 for introducing the laser light having two wavelengths, which has been output from the λ/2 plate 200 and whose polarization has been adjusted, to an optical fiber 400 (described later); the optical fiber 400 where the fiber coupler 300 is disposed to one end portion 400a and a frequency converter 500 (described later) is disposed to the other end portion 400b, and which transmits the laser light having two wavelengths whose polarization has been adjusted, which has been introduced via the fiber coupler 300, to the frequency converter 500; the frequency converter 500 that generates terahertz wave by difference frequency generation using the laser light having two wavelengths whose polarization has been adjusted, which has been transmitted form the optical fiber; a scatter 600 for separating terahertz wave (THz wave) from light output from the frequency converter 500; and a condenser lens 700 that condenses terahertz wave separated by the scatter 600.

Herein, the two-wavelength oscillation laser device 100 uses a so-called Z-hold type laser resonator where the optical path of light reciprocating in the laser resonator is in an alphabet letter "Z" shape, and the Z-hold type laser resonator is constituted by having an output mirror 102 that has predetermined transparency and a total reflection mirror 104.

Furthermore, the Z-hold type laser resonator is constituted by having the first middle mirror 106, into which pumped laser light A is made incident and reflects light B reciprocating between the output mirror 102 and the total reflection mirror 104, and the second middle mirror 108 that reflects light B reciprocating between the output mirror 102 and the total reflection mirror 104, and they are arranged such that the optical path of light B reciprocating in the laser resonator becomes the alphabet letter "Z" shape.

A $Ti^{3+}:Al_2O_3$ laser crystal 110 as a wavelength variable laser medium having a predetermined wavelength variable width, whose incident end surface for incident light is Brewster-cut, is arranged between the first middle mirror 106 and the second middle mirror 108 on the optical path of the laser resonator such that the incident end surface is in a Brewster angle at which reflection of incident light becomes 0, and is constituted such that laser oscillation is generated by vertical direction coaxial pumping of pumped laser light A.

Still further, a $TeO_2$ crystal 112, which is an acoustooptical element (AOTF: acoustooptical tunable filter) having birefringency operating as a variable wavelength filter as a crystal for wavelength selection, is disposed between the second middle mirror 108 and the total reflection mirror 104 on the optical path of the laser resonator.

Then, a piezoelectric element 118, which is driven by an RF power source 116 that outputs RF signals whose frequency is controlled by a personal computer 114, is attached as an acoustic wave input means to the $TeO_2$ crystal 112 as the acoustooptical element. Consequently, when the piezoelectric element 118 is driven by the RF power source 116 that outputs RF signals whose frequency is set to an arbitrary level by the control of the personal computer 114 and distortion is generated in the piezoelectric element 118, acoustic wave having a frequency corresponding to the distortion of the piezoelectric element 118 is input to the $TeO_2$ crystal 112 as the acoustooptical element based on the distortion. Then, the $TeO_2$ crystal 112 as the acoustooptical element diffracts only light D corresponding to the acoustic wave that has been input.

Therefore, in order to output only light B including the wavelength of output laser light C, which is intended to be output from the output mirror 102, as diffracted light D that the $TeO_2$ crystal 112 as the acoustooptical element diffracted in a predetermined direction and to allow the light to perform laser oscillation, the personal computer 114 controls the RF power source 116 and thereby controls the distortion of the piezoelectric element 118 to control the input of acoustic wave to the $TeO_2$ crystal 112.

Moreover, a dispersion-correcting prism 120 as an optical element for correcting the dispersion of diffracted light D is disposed between the $TeO_2$ crystal 112 as the acoustooptical element and the total reflection mirror 104. By using the dispersion-correcting prism 120, the directivity of output laser light C can be stabilized.

Then, in the two-wavelength oscillation laser device 100, a Q-switched laser diode (LD)-pumped Nd:YAG second harmonic generation laser 122 is used as a pumped laser for allowing pumped laser light A to be incident into the laser resonator.

Pumped laser light A that has been generated by the Q-switched laser diode (LD)-pumped Nd:YAG second harmonic generation laser 122 is reflected by total reflection mirrors (124, 126, 128) to be transmitted to the first middle mirror 106, and is made incident to the $Ti:Al_2O_3$ laser crystal 110 via the first middle mirror 106 so as to cause vertical direction axial pumping.

Further, the fiber coupler 300 is constituted by having an optical system lens group 302 and an optical fiber attaching member 304. It is to be noted that a conventionally widely-known fiber coupler can be properly selected and used as the fiber coupler 300.

Next, as the optical fiber 400, a polarization-preserving fiber capable of transmitting light while the plane of polarization of transmitting light is preserved is used in order to satisfy phase-matching conditions during wave conversion in the frequency converter 500 to increase generation efficiency of terahertz wave.

Still further, the frequency converter 500 is constituted by having an optical fiber attaching member 502, a condenser lens 504, a DAST (4-N,N-dimenthylamino-4'-N'-methyl-stilbazolium tosylate) crystal 506 as a nonlinear optical crystal that has a large nonlinear optical constant for generating terahertz wave by difference frequency generation being nonlinear optical effect.

Therefore, light having two wavelengths, which has been generated by the two-wavelength oscillation laser device 100 and transmitted through the optical fiber 400, is condensed by the condenser lens 504 via the optical fiber attaching member 502 and made incident to the DAST crystal 506, and is converted into terahertz wave by difference frequency generation technique through the DAST crystal 506.

Meanwhile, as the λ/2 plate 200, the scatter 600 and the condenser lens 700, a conventionally widely known λ/2 plate, scatter and condenser lens can be properly selected and used, but since terahertz wave generated in the frequency converter 500 is divergent in this embodiment, a lens of "f=70" having high condensing power is used as the condenser lens 700 to condense the divergent terahertz wave and take out condensed terahertz wave.

In the above-described constitution of the terahertz wave generation system 10, light having two different wavelengths is generated as output laser light C in the two-wavelength oscillation laser device 100.

Specifically, to obtain the light having two different wavelengths as output laser light C, the Ti:Al$_2$O$_3$ laser crystal 110 is pumped by using pumped laser light A that has been made incident by the Q-switched laser diode-pumped Nd:YAG second harmonic generation laser 122. Further, the personal computer 114 controls the frequency of RF signals output from the RF power source 116 into two frequencies corresponding to the two wavelengths of output laser light C, which is intended to be output from the output mirror 102, and the piezoelectric element 118 is oscillated.

Consequently, of output light having a wide range of wavelength band output from the Ti:Al$_2$O$_3$ laser crystal 110, which has been made incident to the TeO$_2$ crystal 112 as the acoustooptical element, the output light having wavelengths corresponding to the two frequencies of the RF signals output form the RF power source 116 is diffracted in a predetermined direction and output as diffracted light D from the TeO$_2$ crystal 112 as the acoustooptical element. Further, diffracted light D that has been diffracted in a predetermined direction and output from the TeO$_2$ crystal 112 as the acoustooptical element is made incident to the total reflection mirror 104 via the dispersion-correcting prism 120, reflected by the total reflection mirror 104, and reciprocates in the laser resonator along the optical path of the letter "Z" shape.

Therefore, only light having two wavelengths corresponding to the two frequencies of the RF signals, which has been output from the RF power source 116, is amplified to generate laser oscillation, and only output laser light C having the two wavelengths can be output coaxially.

As described, selection of two wavelengths of output laser light C can be realized by selecting the two frequencies of the RF signals output from the RF power source 116 by the control of the personal computer 114 and by oscillating the piezoelectric element 118 by the RF power source 116, so that fast and random wavelength selection of output laser light C can be done, and as a result, wavelength variable speed of output laser light of output laser light can be made faster.

Furthermore, since the dispersion-correcting prism 120 is provided, dispersion of the diffraction angle of diffracted light D is corrected. When the diffraction angle of diffracted light D is dispersed, the optical path in the laser resonator is changed and a wavelength variable region is limited, but such a problem can be solved by providing the dispersion-correcting prism 120.

As described above, the light having two different wavelengths, which has been output as output laser light C from the two-wavelength oscillation laser device 100 is made incident to the fiber coupler 300 after its polarization is adjusted by the λ/2 plate 200, and made incident to the optical fiber 400 via the fiber coupler 300.

The light having two wavelengths that has been made incident to the optical fiber 400 is transmitted to the frequency converter 500 while the plane of polarization is preserved by the optical fiber 400.

The light having two wavelengths that has been transmitted to the frequency converter 500 is made incident to the DAST crystal 506 after condensed by the condenser lens 504 via the optical fiber attaching member 502. The DAST crystal 506, to which the light having two wavelengths has been made incident, generates terahertz wave by difference frequency generation being nonlinear optical effect. At this point, since the light having two wavelengths is transmitted while the plane of polarization is preserved by the optical fiber 400, phase matching conditions during the wavelength conversion by the DAST crystal 506 are satisfied to increase generation efficiency of terahertz wave.

It is to be noted that the technique where the light having two different wavelengths is made incident to the DAST crystal to generate terahertz wave by the difference frequency generation being the nonlinear optical effect is widely known, so that its detailed explanation will be omitted.

The terahertz wave that has been generated in the DAST crystal 506 by the difference frequency generation as described above is output from the frequency converter 500 together with light that has not been converted into terahertz wave (hereinafter, appropriately referred to as "non-converted light") by the difference frequency generation out of the light having two wavelengths which has been made incident to the DAST crystal 506 in order to generate terahertz wave by the difference frequency generation.

The light output from the frequency converter 500 in this manner is separated into terahertz wave and non-converted light by the scatter 600, the terahertz wave is condensed by the condenser lens 700, and illuminated on the subject of spectroscopic analysis, the subject of imaging measurement or the like.

Therefore, according to the terahertz wave generation system 10, terahertz wave can be easily illuminated on an arbitrary position, simultaneous generation of laser light having two wavelengths, transmission of laser light having two wavelengths or difference frequency generation using laser light having two wavelengths can be realized by effectively using existing systems and devices, so that the system can be easily realized for practical use.

Herein, in the two-wavelength oscillation laser device 100 of the terahertz wave generation system 10, it is possible to randomly sweep the oscillation wavelength region of 700 to 1000 nm at the speed of 10 to 100 μs, that is, the wavelength switch time of 10 to 100 μs to make wavelength tunable in high-speed by inputting RF signal from the RF power source 116 to the TeO$_2$ crystal 112 as an acoustooptical element.

Furthermore, as described above, it is possible to oscillate two wavelengths simultaneously by inputting the RF signal having two frequencies to the TeO$_2$ crystal 112 as an acoustooptical element.

Moreover, by controlling the input signal to the Q switch of the Q-switched laser diode-pumped Nd:YAG second harmonic generation laser 122, operation of high repeating speed at 1 to 100 kHz can be performed, and furthermore, by controlling the RF signal to be input to the TeO$_2$ crystal 112 as an acoustooptical element, coherent terahertz wave can be freely generated in a wide band of 0.5 to 5 THz.

The terahertz wave generation system 10 according to the present invention is a combination of the two-wavelength oscillation laser device 100 being an all-solid-state electronic control two-wavelength titanium-sapphire laser system and the optical fiber 400 on the tip of which the DAST crystal 506 of an organic nonlinear crystal having a large nonlinear optical constant is arranged. The system does not transmit terahertz wave via the optical fiber, but transmits the light having two wavelengths, which has been generated in the two-wavelength oscillation laser device 100, to a position of the subject of spectroscopic analysis or the subject of imaging measurement, and generates terahertz wave by the difference frequency generation caused by the DAST crystal 506 of the frequency converter 500 that is disposed at the end portion 400b of the optical fiber 400.

Therefore, according to the terahertz wave generation system 10, real-time and in vivo measurement of a living body can be performed.

Meanwhile, the present inventors experimentally confirmed that a wavelength distance between the two wavelengths in two-wavelength oscillating operation of the electronic control laser method such as the two-wavelength oscillation laser device 100 could be made as narrow as 0.1 nm.

For example, in the case where light having the wavelengths of 800 nm and 801 nm is oscillated by the two-wavelength oscillating operation in the two-wavelength oscillation laser device 100 and terahertz wave was generated by the difference frequency generation using the light having the wavelengths of 800 nm and 801 nm, its frequency becomes 0.47 THz (wavelength: about 638 μm).

In the difference frequency generation using light having two wavelengths, wavelength can be shortened to wavelength less than 3 μm in the shortest middle infrared wavelength. In short, description has been made in this embodiment for the case where the DAST crystal 506 was used as the nonlinear optical crystal in the frequency converter 500, and it is possible to continuously generate an electromagnetic wave in a terahertz frequency band of the wavelength region of approximately 3 to 600 μm, for example, by using the nonlinear optical crystal in the frequency converter 500 while selectively changing it.

In other words, according to the two-wavelength oscillation laser device 100, the distance between the wavelengths of the light having two wavelengths which is made incident to the nonlinear optical crystal to the extent that the above-described coherent electromagnetic wave in the wavelength region of approximately 3 to 600 μm can be generated by the difference frequency generation, and for this reason, it is possible to generate electromagnetic wave in all frequency regions, which are referred to as terahertz, in the terahertz wave generation system 10.

Figure 2:
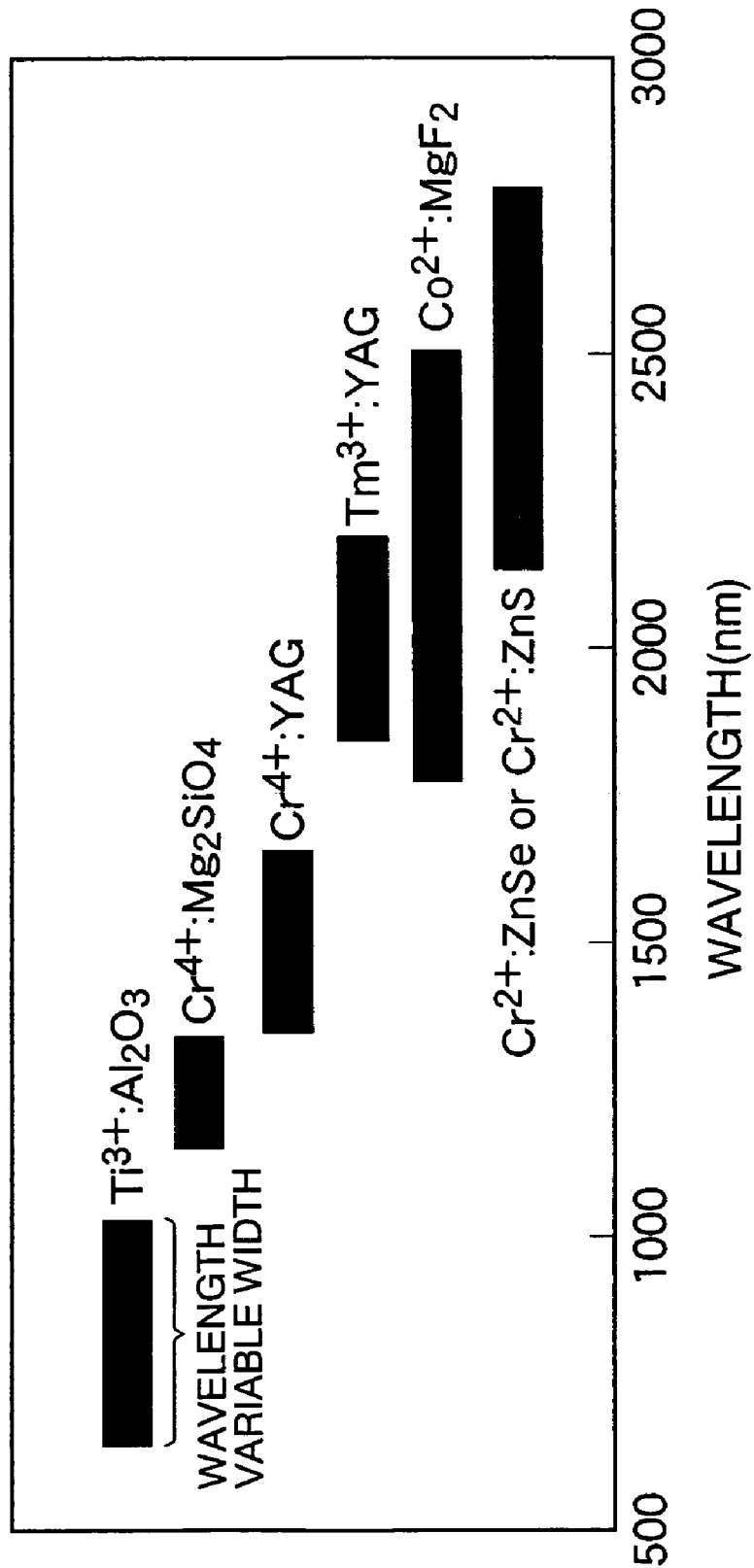
FIG. 2 is an exemplary view showing the wavelength variable widths of $Ti^{3+}:Al_2O_3$, $Cr^{4+}:Mg_2SiO_4$, $Cr^{4+}:YAG$, $Tm^{3+}:YAG$, $Co^{2+}:MgF_2$, $Cr^{2+}:ZnSe$, and $Cr^{2+}:ZnS$.

Still further, since the $TeO_2$ crystal 112 as an acoustooptical element can allow light having the wavelength of 400 to 5000 nm to pass the crystal, $Cr^{4+}:Mg_2SiO_4$, $Cr^{4+}:YAG$, $Tm^{3+}:YAG$, $Co^{2+}:MgF_2$, $Cr^{2+}:ZnSe$ or $Cr^{2+}:ZnS$ can be appropriately selected and used as the wavelength variable laser medium in addition to the $Ti:Al_2O_3$ laser crystal 110 shown as $Ti^{3+}:Al_2O_3$ in FIG. 2, which has the wavelength variable width shown in FIG. 2.

It is to be noted that the above-described embodiments can be modified as shown in (1) to (4) below.

(1) In the above-described embodiments, the two-wavelength oscillation laser device 100 is provided with the dispersion-correcting prism 120 as an optical element for correcting the dispersion of diffracted light D. However, it goes without saying that the invention is not limited to this, and it is unnecessary to dispose an optical element for correcting the dispersion of diffracted light D in the two-wavelength oscillation laser device 100 although the operational effect by the dispersion-correcting prism 120 is eliminated. Thus, when the optical element for correcting the dispersion of diffracted light D is not disposed in the two-wavelength oscillation laser device 100, the entire constitution is simplified and a manufacturing cost can be reduced.

(2) In the above-described embodiments, the two-wavelength oscillation laser device 100 is provided with the dispersion-correcting prism 120 as an optical element for correcting the dispersion of diffracted light D. However, it goes without saying that the optical element is not limited to this, and various kinds of optical element such as a diffraction grating and a grism may be used.

(3) Although crystal names and the like were specifically described regarding the wavelength variable laser medium, the acoustooptical element, the pumped laser or the like in the two-wavelength oscillation laser device 100, such crystal names are only examples. An appropriately desired wavelength variable laser medium, acoustooptical element, pumped laser or the like may be selected corresponding to the frequency of terahertz wave that is intended to be generated.

(4) The above-described embodiments and the above-described modification shown in (1) to (3) may be appropriately combined.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, all changes that come within the meaning and range of equivalents thereof are intended to be embraced therein.

The entire disclosure of Japanese Patent Application No. 2004-367530 filed on Dec. 20, 2004 including specification, claims, drawings and summary are incorporated herein by reference in its entirety.

What is claimed is:

1. A terahertz wave generation system, comprising:
a two-wavelength oscillation laser device capable of simultaneously oscillating laser light having two wavelengths and varying the wavelengths;
a λ/2 plate that adjusts polarization of said laser light having two wavelengths, which has been output from said two-wavelength oscillation laser device;
a fiber coupler for introducing said laser light having two wavelengths, which has been output from said λ/2 plate and whose polarization has been adjusted, to an optical fiber;
said optical fiber where said fiber coupler is disposed to one end portion and a frequency converter is disposed to another end portion, and which transmits said laser light having two wavelengths whose polarization has been adjusted, which has been introduced via said fiber coupler, to said frequency converter;
said frequency converter that generates terahertz wave by difference frequency generation using said laser light having two wavelengths whose polarization has been adjusted, which has been transmitted from said optical fiber;
a scatter for separating the terahertz wave from light output from said frequency converter; and
a condenser lens that condenses the terahertz wave separated by said scatter.

2. The terahertz wave generation system according to claim 1, wherein said two-wavelength oscillation laser device includes:
- a wavelength variable laser medium capable of oscillating laser in a predetermined range of wavelength area;
- a birefringent acoustooptical element into which output light from said wavelength variable laser medium is made incident;
- a single laser resonator, which is a single laser resonator in which said wavelength variable laser medium and said acoustooptical element are sequentially disposed, and consists of mirrors having a predetermined reflectance that are arranged in a facing manner so as to reflect and reciprocate only diffracted light, which has been diffracted in a predetermined direction by said acoustooptical element;
- acoustic wave input means that is installed to said acoustooptical element and inputs acoustic wave into said acoustooptical element; and
- a pumped laser that makes pumped laser light be incident into said laser resonator.

3. The terahertz wave generation system according to claim 1, wherein said two-wavelength oscillation laser device includes:
- a wavelength variable laser medium capable of oscillating laser in a predetermined range of wavelength area;
- a birefringent acoustooptical element into which output light from said wavelength variable laser medium is made incident;
- an optical element that corrects dispersion of diffracted light, which is output from said wavelength optical element, and outputs the light always in a fixed direction regardless of wavelength;
- a single laser resonator, which is a single laser resonator in which said wavelength variable laser medium and said acoustooptical element are sequentially disposed, and consists of mirrors having a predetermined reflectance that are arranged in a facing manner so as to reflect and reciprocate only diffracted light, which has been diffracted in a predetermined direction by said acoustooptical element;
- acoustic wave input means that is installed to said acoustooptical element and inputs acoustic wave into said acoustooptical element; and
- a pumped laser that makes pumped laser light be incident into said laser resonator.

4. The terahertz wave generation system according to claim 1, wherein said optical fiber is a polarization-preserving fiber capable of transmitting light while the plane of polarization of transmitting light is preserved.

5. The terahertz wave generation system according to claim 2, wherein said optical fiber is a polarization-preserving fiber capable of transmitting light while the plane of polarization of transmitting light is preserved.

6. The terahertz wave generation system according to claim 3, wherein said optical fiber is a polarization-preserving fiber capable of transmitting light while the plane of polarization of transmitting light is preserved.

7. The terahertz wave generation system according to claim 1, wherein said frequency converter has a DAST crystal.

8. The terahertz wave generation system according to claim 2, wherein said frequency converter has a DAST crystal.

9. The terahertz wave generation system according to claim 3, wherein said frequency converter has a DAST crystal.

10. The terahertz wave generation system according to claim 4, wherein said frequency converter has a DAST crystal.

11. The terahertz wave generation system according to claim 5, wherein said frequency converter has a DAST crystal.

12. The terahertz wave generation system according to claim 6, wherein said frequency converter has a DAST crystal.

* * * * *